US008904622B2

(12) United States Patent
Kochheiser

(10) Patent No.: US 8,904,622 B2
(45) Date of Patent: Dec. 9, 2014

(54) METHOD OF INSTALLING A FASTENER TO SECURE METAL PANEL TO WOOD ELEMENT

(75) Inventor: Michael A. Kochheiser, Bellville, OH (US)

(73) Assignee: Atlas Bolt & Crew Company LLC, Ashland, OH (US)

( * ) Notice: Subject to any disclaimer, the term of this patent is extended or adjusted under 35 U.S.C. 154(b) by 133 days.

(21) Appl. No.: 13/409,645

(22) Filed: Mar. 1, 2012

(65) Prior Publication Data

US 2012/0207564 A1 Aug. 16, 2012

Related U.S. Application Data

(63) Continuation-in-part of application No. 13/036,465, filed on Feb. 28, 2011, now abandoned.

(60) Provisional application No. 61/309,665, filed on Mar. 2, 2010.

(51) Int. Cl.
*B23P 11/00* (2006.01)
*F16B 25/00* (2006.01)

(52) U.S. Cl.
CPC ......... *F16B 25/0031* (2013.01); *F16B 25/0036* (2013.01); *F16B 25/0068* (2013.01); *F16B 25/0073* (2013.01); *F16B 25/0052* (2013.01); *F16B 25/0057* (2013.01); *F16B 25/0084* (2013.01)
USPC .................. 29/525.11; 411/387.3; 411/387.4; 411/413

(58) Field of Classification Search
CPC ............. F16B 25/0031; F16B 25/0068; F16B 25/0073; F16B 25/0042; F16B 25/0052; F16B 25/0057
USPC ............ 29/525.11; 411/412, 413, 386, 387.1, 411/387.2, 387.3, 387.4
See application file for complete search history.

(56) References Cited

U.S. PATENT DOCUMENTS

| 2,380,724 | A | | 7/1945 | Crooks | |
|---|---|---|---|---|---|
| 4,621,963 | A | * | 11/1986 | Reinwall | ........................ 411/369 |
| 4,653,244 | A | * | 3/1987 | Farrell | ........................ 52/745.21 |

(Continued)

FOREIGN PATENT DOCUMENTS

| CN | 86207346 | 11/1987 |
|---|---|---|
| CN | 2457395 Y | 10/2001 |
| DE | 20014147 U1 | 12/2000 |

OTHER PUBLICATIONS

File History of U.S. Appl. No. 14/098,136.

*Primary Examiner* — Jermie Cozart
(74) *Attorney, Agent, or Firm* — DLA Piper LLP (US); Jennifer E. Lacroix

(57) ABSTRACT

Fasteners are provided that include a head and having a head, a tip end having a tip, a first body portion having first threads having a pitch angle, and a second body portion having second threads, the second threads having a different pitch than the first threads. The first body portion is adjacent to the tip end of the fastener and extends a first distance along a length of the fastener towards the head end. The second body portion is adjacent to the first body portion, and extends the head end of the fastener and extending a second distance along the length of the fastener towards the head end.

14 Claims, 4 Drawing Sheets

(56) References Cited

U.S. PATENT DOCUMENTS

| | | | |
|---|---|---|---|
| 4,781,503 A * | 11/1988 | Bogel | 411/368 |
| 5,110,245 A | 5/1992 | Hiroyuki | |
| 5,304,024 A | 4/1994 | Schuster | |
| 6,109,850 A * | 8/2000 | Commins | 411/387.2 |
| 6,450,748 B1 | 9/2002 | Hsu | |
| 6,616,391 B1 | 9/2003 | Druschel | |
| 6,854,942 B1 * | 2/2005 | Hargis | 411/369 |
| 6,926,484 B2 * | 8/2005 | Kram et al. | 411/311 |
| 7,037,059 B2 | 5/2006 | Dicke | |
| 7,402,016 B2 | 7/2008 | Yin-Feng | |
| 7,695,228 B2 * | 4/2010 | Craven | 411/413 |
| 7,832,173 B2 * | 11/2010 | Crawford et al. | 52/690 |
| 8,348,571 B2 | 1/2013 | Shih | |
| 2002/0094255 A1 | 7/2002 | Neuhengen | |
| 2004/0151559 A1 * | 8/2004 | Craven | 411/413 |
| 2005/0265806 A1 * | 12/2005 | Craven | 411/386 |
| 2006/0140741 A1 | 6/2006 | Lin | |
| 2007/0217887 A1 * | 9/2007 | Lin | 411/413 |
| 2009/0010734 A1 * | 1/2009 | Lin | 411/413 |
| 2009/0104001 A1 * | 4/2009 | Kochheiser | 411/383 |
| 2009/0245973 A1 * | 10/2009 | Pieciak et al. | 411/413 |
| 2010/0196122 A1 | 8/2010 | Craven | |

* cited by examiner

METHOD OF INSTALLING A FASTENER TO SECURE METAL PANEL TO WOOD ELEMENT

CROSS-REFERENCE TO RELATED APPLICATIONS

This application is a continuation-in-part of U.S. application Ser. No. 13/036,465, filed on Feb. 28, 2011 now abandoned, currently, which claims the benefit of U.S. Provisional Application Ser. No. 61/309,665, filed Mar. 2, 2010, which has expired.

FIELD OF THE INVENTION

The present technology relates to fasteners and methods of installing fasteners, and particularly fasteners that can be used to secure metal panels to wood building structures.

BACKGROUND

In the construction industry, post frame metal building materials are attached to the wooden frame structure with various types of wood fasteners. However, current wood fastener thread designs have a tendency to back-out over time, thus weakening the connection and the building's structural integrity. Additionally, known fasteners can have a tendency to break during installation due to high drive torques in certain high density materials, as well as having a tendency to strip-out in certain low density materials.

SUMMARY OF THE INVENTION

The present technology relates to fasteners and methods of installing fasteners in order to secure metal panels to wood building structures.

In one aspect, a fastener is provided that includes a head end having a head, a tip end having a tip, a first body portion, and a second body portion. The first body portion is adjacent to the tip end of the fastener and extends a first distance along a length of the fastener towards the head end. The first body portion includes first threads having a pitch angle α of less than about 60°. The second body portion is adjacent to first body portion and extends a second distance along the length of the fastener towards the head end. The second body portion includes second threads having a different pitch than the threads of the first body portion. The second threads of the second body portion can be left-hand threads or right-hand threads.

In a second aspect, a fastener is provided that includes a head and having a head, a tip end having a tip, a first body portion, and a second body portion. The first body portion is adjacent to the tip end of the fastener and extends a first distance along a length of the fastener towards the head end. The first body portion includes first threads having a first pitch, and a pitch angle α from about 20° to about 40°. The second body portion is adjacent to first body portion and extends a second distance along the length of the fastener towards the head end. The second body portion includes second threads having a second pitch, the second pitch being different than the first pitch of the first threads on the first body portion. The threads of the second body portion can be left-hand threads or right-hand threads having a pitch angle α from about 20° to about 40°.

In a third aspect, a method of installing a fastener to secure a metal panel to a wood structural element is provided that includes the steps of creating a bur of metal as a tip of the fastener penetrates the metal panel; causing an area of the metal panel immediately surrounding the fastener to pull away from the wood structural element as first threads on a first body portion of the fastener pass through the metal panel; contacting the bur of metal with threads on a second body portion of the fastener; removing the bur of metal as the threads on the second body portion pass through the metal panel; pushing the area of the metal panel towards the wood structural element; and contacting the wood structural element with the area of the metal panel prior to the area of the metal panel being contacted with the head of the fastener.

BRIEF DESCRIPTION OF THE DRAWINGS

Specific examples have been chosen for purposes of illustration and description, and are shown in the accompanying drawings, forming a part of the specification.

DETAILED DESCRIPTION

Fasteners of the present technology can be used in any suitable application, but are most particularly suited to construction applications in which metal building materials are secured to wood frame structures.

FIGS. 1-4 illustrate examples of a fastener 100 of the present technology. The same reference numbers have been used for aspects that are the same in each of the illustrated examples. The fastener 100 can be made of any suitable material, including for example carbon steel. Additionally, the fastener 100 can have a coating, such as a coating to improve the weather resistance properties of the fastener 100. A fastener 100 can have any suitable length, including but not limited to 1 inch, 1.5 inches, 2 inches, 2.5 inches, or 3 inches.

Figure 1:
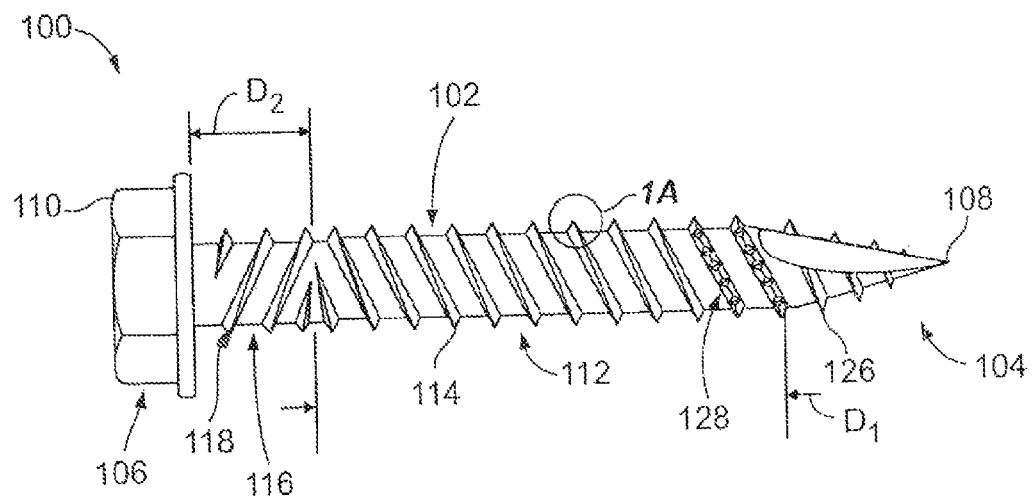
FIG. 1 is a side elevational view of one example of a fastener of the present technology.
Figure 2:
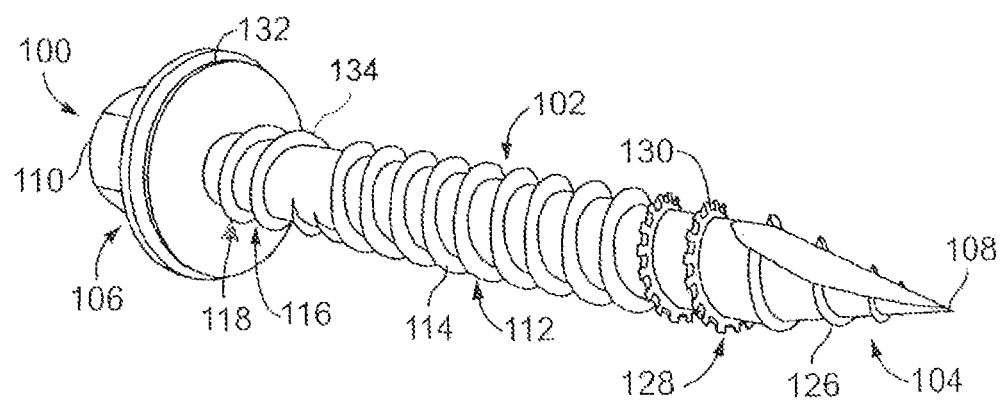
FIG. 2 is a perspective view of a second example of a fastener of the present technology, having a sealing washer assembled therewith.
Figure 3:
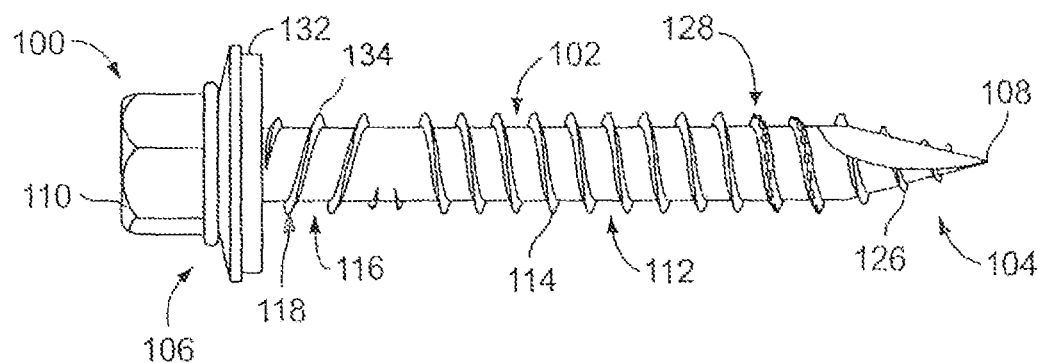
FIG. 3 is a side elevational view of the fastener of FIG. 2, having a sealing washer assembled therewith.

As illustrated in FIGS. 1-4, the fastener 100 has a body 102 that includes a tip end 104 and a head end 106. The fastener 100 has a point 108 at the tip end 104 of the body, and a head 110 at the head end 106 of the body. The fastener 100 also has a first body portion 112 that is adjacent to the tip end 104 and includes first threads 114, and a second body portion 116 that is adjacent to the head end 106 and includes second threads 118. The head of the fastener 100 can be any suitable style. The tip end 104 of the fastener 100 can include one or more partially formed threads 126. The point 108 of the fastener 100 can include a sharp, self-tapping point. In the illustrated example, the fastener 100 has a type-17 point, which can allow for desired penetration in lapped metal conditions. As illustrated in FIGS. 2 and 3, a sealing washer 132 can be included with, or assembled to a fastener 100. The sealing washer 132 can be any suitable material, such as rubber, and may be placed on the fastener 100 adjacent to and abutting the head 106.

The first body portion of the fastener 100 is adjacent to the tip end 104 of the fastener 100 and extends a first distance $D_1$ along the length of the fastener 100 towards the head end 106. The first body portion 112 includes first threads 114, which as illustrated can be right-hand threads. The first threads 114 can be single or multi-lead threads. The first threads 114 can have any suitable diameter and number of threads per inch of length along the body of the fastener. For example, the first threads 114 of the illustrated embodiment are 10-14 threads, having a #10 diameter, which is a major diameter of about 0.19 inches plus or minus normal ANSI tolerances, and about 14 threads per inch. As illustrated in the detail call-out of FIG. 1A, the first threads 114 have a first pitch A, which is the linear distance between the crest of one thread and the crest of the next thread. First threads 114 also have a pitch angle α that is less than standard threads having a 60° pitch angle. For example, the first threads 114 of the fastener 100 can have a pitch angle α that is from 20° to about 40°.

The pitch angle α of the first threads 114 can have a 0° to 10°/20° to 30° geometric configuration. In such an example, each thread has a first internal angle β on the tip side 120 of the thread, which faces towards the tip 108 of the fastener 100, and a second internal angle γ on the head side 122 of the thread, which faces the head end 110 of the fastener 100. For example, the tip side 120 and the head side 122 of each thread slope towards each other from the base of the thread and meet at a point 124 that is a certain height from the body 102 of the fastener 100. When a vertical reference line B is drawn to the body of the fastener from the point 124, the tip side 120 of the thread slopes away from the vertical reference line at the first internal angle β, which can be from about 20° to about 30°. In such an example, the head side 122 of the thread slopes away from the vertical reference line at the second internal angle γ, which can be from about 0° to about 10°. For example, the thread pitch angle α can be about 30°, with the first internal angle β of the tip side 120 being about 20°, and the second internal angle γ of the head side 122 being about 10°. In at least some examples, the geometric configuration of the threads can improve the fastener's resistance to backing out over time after installation.

In some examples, one or more of the first fully formed first threads 114 on the first body portion 112, which are the threads closest to the tip end 104 of the fastener, can include serrations 128. In at least one example, at least one of the first three fully formed first threads 114 on the first body portion 112, which are the threads closest to the tip end 104 of the fastener, can include serrations 128. For example, one, two, or all three of the first fully formed first threads 114 can include serrations 128. In the examples illustrated in FIGS. 1 and 2, the first two fully formed threads include serrations 128. In the example illustrated in FIG. 2, the serrations 128 can be teeth 130. Such teeth can be rectangular, as illustrated in FIG. 2, or can have any other suitable shape, such as being triangular. In at least some examples, serrations 128 can reduce the drive torque needed to install the faster 100, and facilitate installation of the fastener 100 through knots and hardwood. Additionally, it is common that when a fastener pierces metal siding, a bur of metal can be created, which is sometimes called a pig-tail. The inclusion of serrations 128 can result in the bur being removed then the serrated threads contact the bur as the fastener 100 is being installed.

The second body portion 116 of the fastener 100 is adjacent to the first body portion 112 of the fastener 100 and extends a second distance $D_2$ along the length of the fastener 100 towards the head end 106. In preferred examples, the length of the second body portion can be less than the length of the first body portion. For example, with reference FIG. 1, the second distance $D_2$ of the second body portion 116 can be less than the first distance $D_1$ of the first body portion. In some examples, such as when the total length of the fastener 100 is about 3 inches or less, the length of the second body portion, which is equal to the second distance $D_2$ of the second body portion, can be less than or equal to about one quarter of an inch (0.6 cm).

The second body portion 116 includes second threads 118 having a second pitch B, the second pitch B being different than the first pitch A of the first threads 114. The second threads 118 of the second body portion can be left-hand threads or right-hand threads. The second threads 118 can be single or multi-lead threads. The second threads 118 can have any suitable diameter and number of threads per inch of length along the body of the fastener. The second body portion 116 of the fastener 100 can include any number of second threads 118, including, for example, from about 1 thread to about 5 threads, or preferably from about 2 threads to about 4 threads. The second threads 118 can be any suitable diameter, including for example having the same diameter as the first threads 114, or being oversized, meaning that the second threads 118 can have a larger diameter than the first threads 114.

Figure 1A:
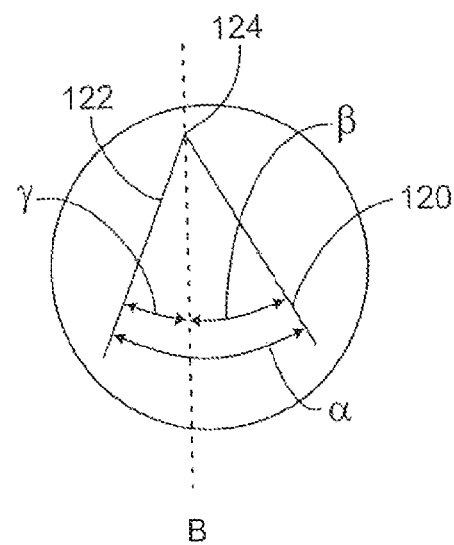
FIG. 1A is a detail view of the area A of FIG. 1.

As illustrated in FIGS. 1 and 2, the second threads 118 are left-hand threads 134, and can be 10-12 threads, having a #10 diameter, which is a major diameter of about 0.19 inches plus or minus normal ANSI tolerances, and about 12 threads per inch.

Figure 4:
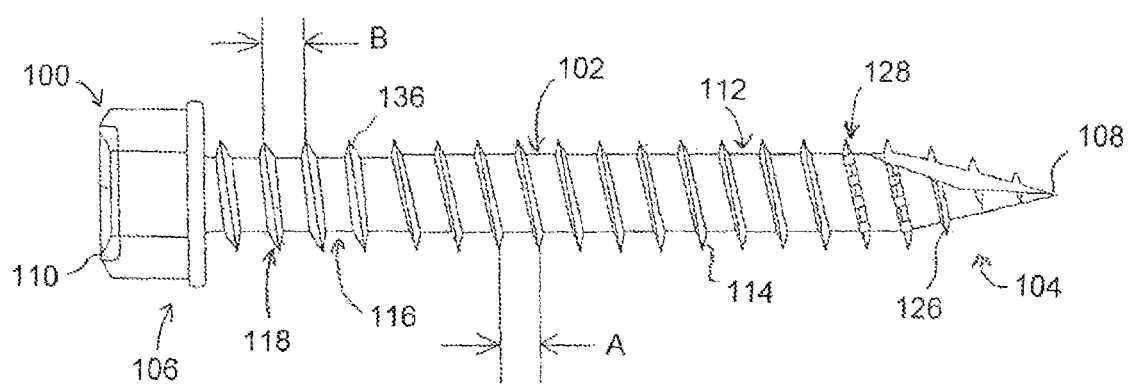
FIG. 4 is a side elevational view of a third example of a fastener of the present technology.
Figure 5:
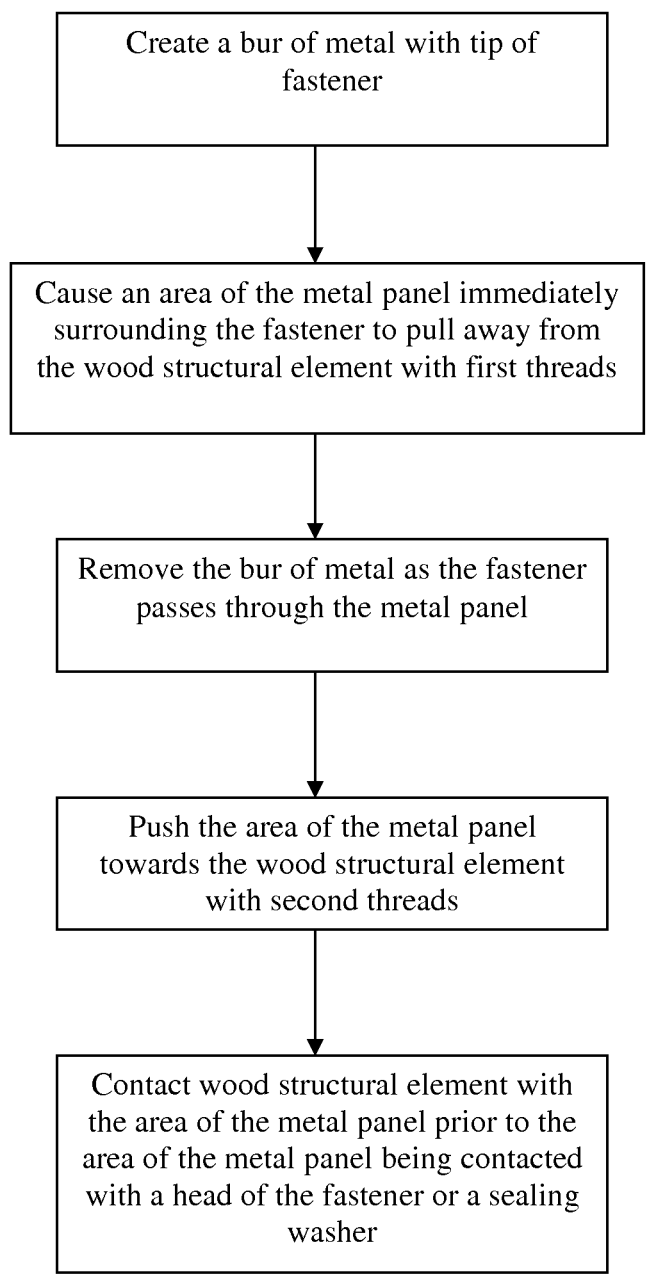
FIG. 5 is a flow chart illustrating one example of a method of using a fastner of the present technology.

As illustrated in FIG. 4, the second threads 118 are right-hand threads 136, and the pitch B of the second threads 118 is less than the pitch A of the first threads 114. In other examples, the pitch B of the second threads 118 could be greater than the pitch A of the first threads.

In at least some examples when a fastener is being installed through metal siding, the second threads 118 can result, in the bur being removed that is commonly created when the fastener pierces the metal siding. Additionally, the second threads 118 can invert the edge of the metal around the insertion hole of the fastener 100, which can create a smooth surface and may prevent the metal siding from cutting and damaging the rubber sealing washer 132. Further, while first threads 114 tend to back-out over time due to expansion and contraction of the building materials and the fastener when subjected to varying weather conditions, the second threads 118 can tend to apply force in opposite direction, resisting back-out.

In at least one application, fasteners of the present technology can be used to secure metal panels to wood building structures. One method of installing a fastener 100 of the present technology can include steps of inserting the fastener through a metal panel and into a wood structural element. A sealing washer 132 can be assembled to the fastener 100 prior to inserting the fastener 100 through the metal panel and into the wood structural element. As with conventional fasteners, the step of inserting the fastener 100 can include the fastener 100 creating a bur, or pigtail, of metal that is attached to the metal panel as the tip 108 of the fastener penetrates the metal panel. Additionally, as also tends to be observed with conventional fasteners, the step of inserting the fastener 100 can include the first threads 114 of the fastener causing an area of the metal panel immediately surrounding the fastener 100 to pull away from the wood structural element, as the first threads 114 of the first body portion 102 of the fastener 100 pass through the metal panel. In methods of installing conventional fasteners, creating a bur of metal and causing the area of the metal panel immediately surrounding the fastener to pull away from the wood structural element can each tend to cause damage to the sealing washer.

However, in methods of installing fasteners of the present technology, such damage to the washer may be reduced or prevented. For example, the step of inserting a fastener 100 can also include the fastener 100 removing the bur of metal as it passes through the metal panel. In some examples, removing the bur of metal can include contacting the bur of metal with the second threads 118 on the second body portion of the fastener, and one or more of the second threads detaching the bur of metal as the second threads 118 pass through the metal panel. In one such example, the first threads 114 can be double lead threads, and the second threads 118 can be single lead threads, which may cause the second threads 118 to be pulled through the metal faster and thus detach the bur. Alternatively, where the fastener includes one or more first threads 114 having serrations 128, removing the bur of metal can include contacting the bur of metal with the serrations 128 on the one or more first threads 114, and one or more of the serrations 128 detaching the bur of metal as the one or more first threads 114 having serrations 128 pass through the metal panel.

Additionally, in practice, the metal panel can stop pulling away from the wood structural element at the junction of the first and second threads. Once the second threads 118 make contact with the metal panel, the second threads 118 can push the metal panel toward the wood structural element prior to the fastener being fully inserted, at which point the area of the metal panel would be in contact with the head 110 of the fastener 100, or with the sealing washer 132 that can be adjacent to and abutting the head 110 of the fastener 100. Accordingly, the step of inserting a fastener 100 can also include pushing the area of the metal panel, which had been caused to pull away from the wood structural element, towards the wood structural element, and contacting the wood structural element with the area of the metal panel prior to the area of the metal panel being contacted with the head of the fastener or the sealing washer adjacent to the head of the fastener. This may enable the fastener installer to know that the metal panel has made contact with the wood structural element prior to the fastener being completely installed. In such instances, the fastener installer can then apply an appropriate final seating torque to the fastener, thus properly compressing the sealing washer; and preventing the fastener and sealing washer from being over-torqued, which may damage the sealing washer and result in leaks.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of installing a fastener to secure a metal panel to a wood structural element is provided that comprises the steps of:
    creating a bur of metal with a tip of the fastener as the tip of the fastener penetrates the metal panel;
    causing an area of the metal panel immediately surrounding the fastener to pull away from the wood structural element with first threads on a first body portion of the fastener as the first threads pass through the metal panel, the first threads having a first pitch;
    removing the bur of metal as the fastener passes through the metal panel;
    pushing the area of the metal panel towards the wood structural element with second threads on a second body portion of the fastener as the second threads pass through the metal panel, the second threads having a second pitch that is different from the first pitch of the first threads; and
    contacting the wood structural element with the area of the metal panel prior to the area of the metal panel being contacted with a head of the fastener or a sealing washer adjacent to the head of the fastener.

2. The method of claim 1, wherein the step of removing the bur of metal comprises:
    contacting the bur of metal with the second threads on the second body portion of the fastener; and
    detaching the bur of metal with the second threads as the second threads pass through the metal panel.

3. The method of claim 1, wherein at least one of the first three fully formed first threads on the first body portion includes serrations and the step of removing the bur of metal comprises:
    contacting the bur of metal with the at least one fully formed first threads having serrations; and
    detaching the bur of metal as the at least one fully formed first threads having serrations pass through the metal panel.

4. The method of claim 1, wherein the first threads are double lead threads and the second threads are single lead threads.

5. The method of claim 1, wherein the first threads have a pitch angle $\alpha$ that is less than about 60°, and the method further includes the geometric configuration of the first threads performing a step of resisting back out over time.

6. The method of claim 5, wherein the first threads have a pitch angle $\alpha$ that is from about 20° to about 40°.

7. The method of claim 1, the pitch angle of the first threads comprising:
    a first internal angle $\beta$ that is from about 20° to about 30°; and
    a second internal angle $\gamma$ that is from about 0° to about 10°;
    wherein the method further includes the geometric configuration of the first threads performing a step of resisting back out over time.

8. The method of claim 1, wherein a second distance of the second body portion is less than a first distance of the first body portion.

9. The method of claim 1, wherein the second threads are left-hand threads.

10. The method of claim 1, wherein the second threads are right-hand threads.

11. A method of installing a fastener to secure a metal panel to a wood structural element is provided that comprises the steps of:
    creating a bur of metal with a tip of the fastener as the tip of the fastener penetrates the metal panel;
    causing an area of the metal panel immediately surrounding the fastener to pull away from the wood structural element with first threads on a first body portion of the fastener as the first threads pass through the metal panel, the first threads being right hand threads having a first pitch, with a pitch angle $\alpha$ that is from about 20° to about 40°;
    removing the bur of metal as the fastener passes through the metal panel;
    pushing the area of the metal panel towards the wood structural element with second threads on a second body portion of the fastener as the second threads pass through the metal panel, the second threads having a second pitch that is different from the first pitch of the first threads;

contacting the wood structural element with the area of the metal panel prior to the area of the metal panel being contacted with a head of the fastener or a sealing washer adjacent to the head of the fastener.

12. The method of claim 11, wherein the step of removing the bur of metal comprises:
   contacting the bur of metal with the second threads on the second body portion of the fastener; and
   detaching the bur of metal as the second threads pass through the metal panel.

13. The method of claim 11, wherein at least one of the first three fully formed first threads on the first body portion includes serrations and the step of removing the bur of metal comprises:
   contacting the bur of metal with the at least one fully formed first threads having serrations; and
   detaching the bur of metal as the at least one fully formed first threads having serrations pass through the metal panel.

14. The method of claim 11, the pitch angle of the first threads comprising:
   a first internal angle $\beta$ that is from about 20° to about 30°; and
   a second internal angle $\gamma$ that is from about 0° to about 10°;
   wherein the method further includes the geometric configuration of the first threads performing a step of resisting back out over time.

\* \* \* \* \*